United States Patent
Moore et al.

(10) Patent No.: US 6,704,033 B2
(45) Date of Patent: Mar. 9, 2004

(54) GOAL-ORIENTED DESIGN FOR THE PRINTER PROPERTY'S GRAPHICAL USER INTERFACE

(75) Inventors: John Anthony Moore, Cincinnati, OH (US); Brandon Lynn Satanek, Lexington, KY (US); Michelle Anne Sublette, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 469 days.

(21) Appl. No.: 09/729,937

(22) Filed: Dec. 5, 2000

(65) Prior Publication Data

US 2002/0067375 A1 Jun. 6, 2002

(51) Int. Cl.⁷ ................................. G06F 3/00
(52) U.S. Cl. ........................ 345/777; 345/715
(58) Field of Search ................. 345/705–715, 345/777

(56) References Cited

U.S. PATENT DOCUMENTS

| | | |
|---|---|---|
| 5,061,958 A | 10/1991 | Bunker et al. |
| 5,079,723 A | 1/1992 | Herceg et al. |
| 5,115,501 A | 5/1992 | Kerr |
| 5,220,675 A | 6/1993 | Padawer |
| 5,317,687 A | 5/1994 | Torres |
| 5,384,910 A | 1/1995 | Torres |
| 5,392,386 A | 2/1995 | Chalas |
| 5,432,902 A | 7/1995 | Matsumoto |
| 5,467,434 A | 11/1995 | Hower, Jr. et al. |
| 5,491,795 A | 2/1996 | Beaudet |
| 5,500,929 A | 3/1996 | Dickinson |
| 5,546,528 A | 8/1996 | Johnston |
| 5,557,731 A | 9/1996 | Li et al. |
| 5,559,946 A | 9/1996 | Porter |
| 5,600,779 A | 2/1997 | Palmer |
| 5,680,558 A | 10/1997 | Hatanaka |
| 5,706,456 A | 1/1998 | Dupper |
| 5,742,836 A | 4/1998 | Turpin |
| 5,784,059 A | 7/1998 | Morimoto |
| 5,799,268 A | 8/1998 | Boguraev |
| 5,828,374 A * | 10/1998 | Coleman et al. ............ 345/786 |
| 5,828,376 A | 10/1998 | Solimene |
| 5,867,157 A | 2/1999 | Goddard |
| 6,100,857 A | 8/2000 | Tani |
| 6,134,019 A | 10/2000 | Wantuck, Jr. et al. |
| 6,295,136 B1 * | 9/2001 | Ono et al. ................. 358/1.15 |
| 6,330,007 B1 * | 12/2001 | Isreal et al. ................. 345/762 |
| 6,452,607 B1 * | 9/2002 | Livingston ................... 345/705 |
| 6,549,300 B2 * | 4/2003 | Motamed et al. .......... 358/1.18 |

\* cited by examiner

Primary Examiner—Cao (Kevin) Nguyen
(74) Attorney, Agent, or Firm—Needle & Rosenberg, P.C.

(57) ABSTRACT

In a method of providing a control interface for a digital device, a plurality of divider images are displayed so that one of the divider images appears to be on top of the plurality of divider images. Each divider image has a top edge, an opposite bottom edge, a left edge and an opposite right edge and each divider image displays control information relating to a different controllable feature of the digital device. A tab extends from the left edge of each divider image and each tab displays text that describes the control information displayed on a corresponding divider image. A pull-down menu that provides a plurality of desired results relating to a selected controllable feature of the digital device is displayed and input indicating a selection of a desired result by the user is received from a user. A plurality of instructions that indicate which divider image should be selected by the user to achieve the selected desired result and how to achieve the selected desired result are displayed to the user.

6 Claims, 2 Drawing Sheets

GOAL-ORIENTED DESIGN FOR THE PRINTER PROPERTY'S GRAPHICAL USER INTERFACE

BACKGROUND OF THE INVENTION

1. Field of the Invention

This invention relates to graphical user interfaces for computer displays. More particularly, this invention relates to a graphical user interface that facilitates system control.

2. The Prior Art

Many computer printer users are not thoroughly familiar with printer driver software. Since printer driver software is used from within an application, it is less obvious than more frequently used software. Furthermore, it is used by people of varying skill levels for multiple printing tasks. Existing printer-related help files and user manuals typically contain user technical printer jargon (e.g., "halftoning" and "dpi"), as does the driver interface. However, many typical users do not understand such jargon.

Printer controls are typically grouped semantically across various tab sheets. While this layout may be meaningful to expert users, new users are often unsure about which controls need adjustment, how these controls relate to each other and where certain controls are located. Such users may not understand, for example, why paper type is not listed along with paper size. While typical help screens usually explain what the controls do, they often do not explain how to accomplish specific tasks or why certain controls may need to be adjusted. Also, most help screens relate to a particular tab that is open. If a user is not sure where to go to find a certain control, or what the control is named, the help screen often does not direct the user to the appropriate tab. Compounding the confusion of navigation and use of controls is the fact that only a few words are used in the small tab indicators across the top of the tab sheets displayed in the printer control interface. Therefore, limited information is conveyed by such tabs.

When considering typical user goals during printing, the problem worsens. For example, a user may wish to optimize the software for photographic printing. Upon entering the printer driver, the user will be confronted with a variety of user interface controls and choices tabs. Both quality and paper size controls may each require adjustment to print a photograph. Not only are these items likely to be located in different regions of the printer driver interface, but the user may not even know that a particular item needs to be adjusted. Traditional help, because it is control-designated, rather than task-designated, does not specifically state which of the controls needs to be adjusted or what the settings should be in order to achieve a desired result. Even if the user does know which adjustments are needed, the act of switching between tabs may cause confusion regarding which items have been selected and what will happen when changes to the driver are effected.

Therefore, there exists a need for a printer property graphical user interface that is goal-oriented and that presents relevant control information in a concise format.

SUMMARY OF THE INVENTION

In one aspect, the invention is a method of providing a control interface for a digital device in which a plurality of divider images are displayed so that one of the divider images appears to be on top of the plurality of divider images. Each divider image displays control information relating to a different controllable feature of the digital device. A tab extends from a selected edge of each divider image. Each tab displays a summary of the control information displayed on the corresponding divider image.

Another aspect of the invention is a method of providing a control interface for a digital device, in which a plurality of divider images are displayed so that one of the divider images appears to be on top of the plurality of divider images. Each divider image has a top edge, an opposite bottom edge, a left edge and an opposite right edge and each divider image displays control information relating to a different controllable feature of the digital device. A tab extends from the left edge of each divider image and each tab displays text that describes the control information displayed on a corresponding divider image. A pull-down menu that provides a plurality of desired results relating to a selected controllable feature of the digital device is displayed and input indicating a selection of a desired result by a user is received from the user. A plurality of instructions that indicate which divider image should be selected by the user to achieve the selected desired result and how to achieve the selected desired result are displayed to the user.

In yet another aspect, the invention is a computer programmed to display a control interface icon for a digital device. The computer includes a computer monitor and a processor. The processor is programmed to execute the following operations: display a plurality of divider images so that one of the divider images appears to be on top of the plurality of divider images, wherein each divider image has a top edge, an opposite bottom edge, a left edge and an opposite right edge and wherein each divider image displays control information relating to a different controllable feature of the digital device; and display a tab extending from the left edge of each divider image, wherein each tab displays text that describes the control information displayed on a corresponding divider image.

These and other aspects will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
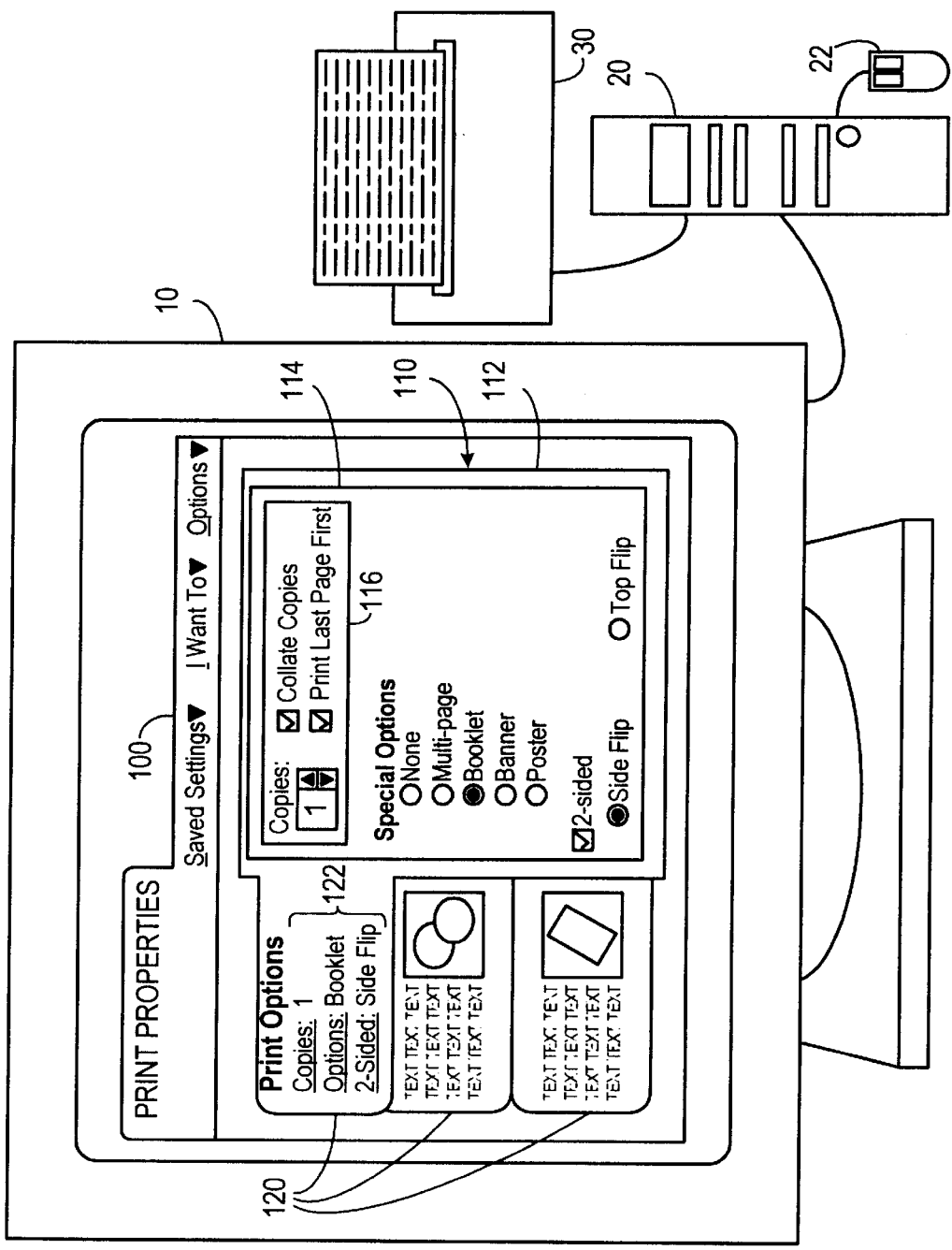
FIG. 1 is an elevational view of a first aspect of the invention.

A preferred embodiment of the invention is now described in detail. Referring to the drawings, like numbers indicate like parts throughout the views.

One typical embodiment of the invention, shown in FIG. 1, includes a method of providing a control interface 100 for a digital device 30, such as a printer that is coupled to a computer 20. A mouse 22 typically provides user input to the computer 20. The control interface 100 is typically displayed on a monitor 10 that is also coupled to the computer 20. A plurality of divider images 110 is displayed on the monitor 10 so that one of the divider images 112 appears to be on top of the plurality of divider images 110. Each divider image 110 may be placed on top by pointing and clicking with the mouse 22, as is common to the art of graphical user interface design. Each of the divider images 110 displays a set of control information 114 relating to a different controllable feature of the digital device 30. The controllable feature could include such features as a print quality control, a number of copies control, a paper setup control, a print style control, or any of the many controllable features commonly associated with printers. An image of a tab 120 is displayed so as to extend from a selected edge of each divider image 110. Each tab 120 displays a summary 122 of the control information 114 displayed on the corresponding divider image 110.

Figure 2:
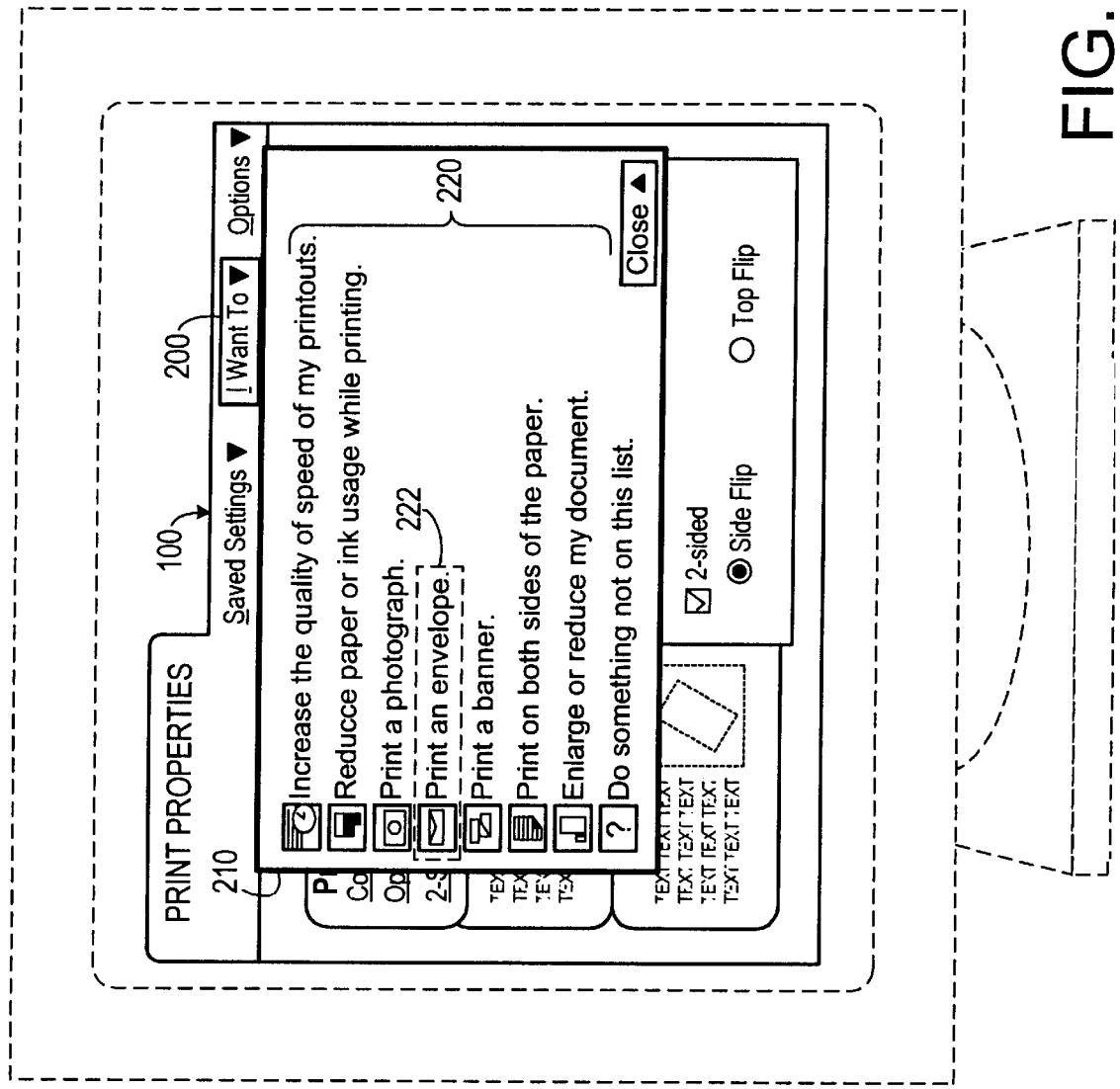
FIG. 2 is an elevational view of a second aspect of the invention.

As shown in FIG. 2, the control interface 100, may also include an "I Want To" pull-down tab 200 that, when selected, causes a pull-down menu 210 to be displayed. The pull-down menu 210 lists a plurality of desired results 220. The user may select one of the desired results 222 (e.g., printing an envelope 220 and the interface will display a help screen that provides step-by-step instructions as to how to achieve the desired result.

The above described embodiments are given as an illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A method of providing a control interface for a digital device, comprising:

a. displaying a plurality of divider images so that one of the divider images appears to be on top of the plurality of divider images, wherein each divider image has a top edge, an opposite bottom edge, a left edge and an opposite right edge and wherein each divider image displays control information relating to a different controllable feature of the digital device;

b. displaying a tab extending from the left edge of each divider image, wherein each tab displays text that summarizes the control information displayed on a corresponding divider image;

c. displaying a pull-down menu that provides a plurality of desired results relating to a selected controllable feature of the digital device;

d. receiving input from a user indicating a selection by the user of at least one of the plurality of desired results by the user;

e. displaying a plurality of instructions to the user that indicate which divider image should be selected by the user to achieve the selected at least one of the plurality of desired results and how to achieve the selected at least one of the plurality of desired results.

2. The method of claim 1, wherein the digital device comprises a printer.

3. The method of claim 2, wherein the controllable feature comprises a print quality control.

4. The method of claim 2, wherein the controllable feature comprises a number of copies control.

5. The method of claim 2, wherein the controllable feature comprises a paper setup control.

6. The method of claim 2, wherein the controllable feature comprises a print style control.

* * * * *